UNITED STATES PATENT OFFICE.

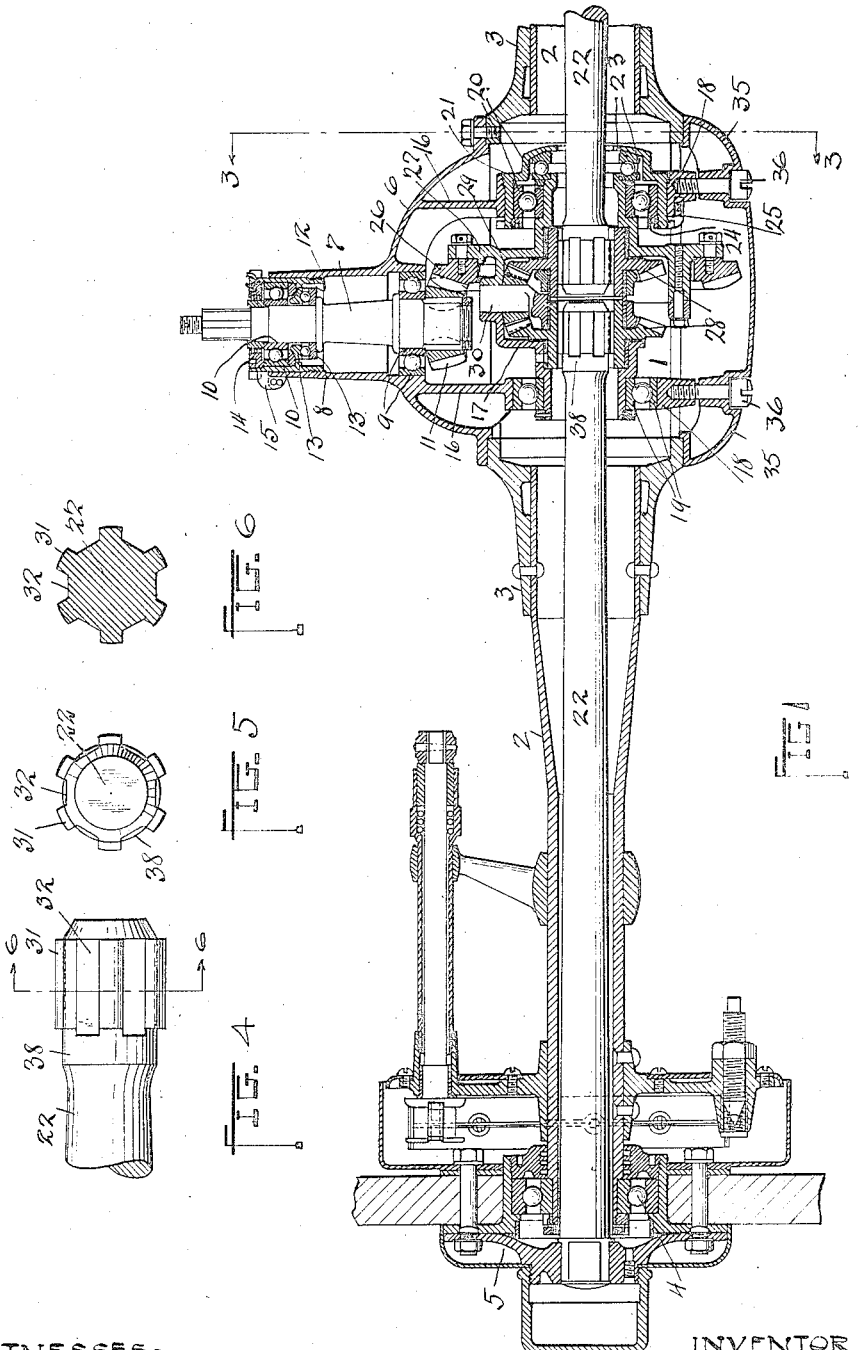

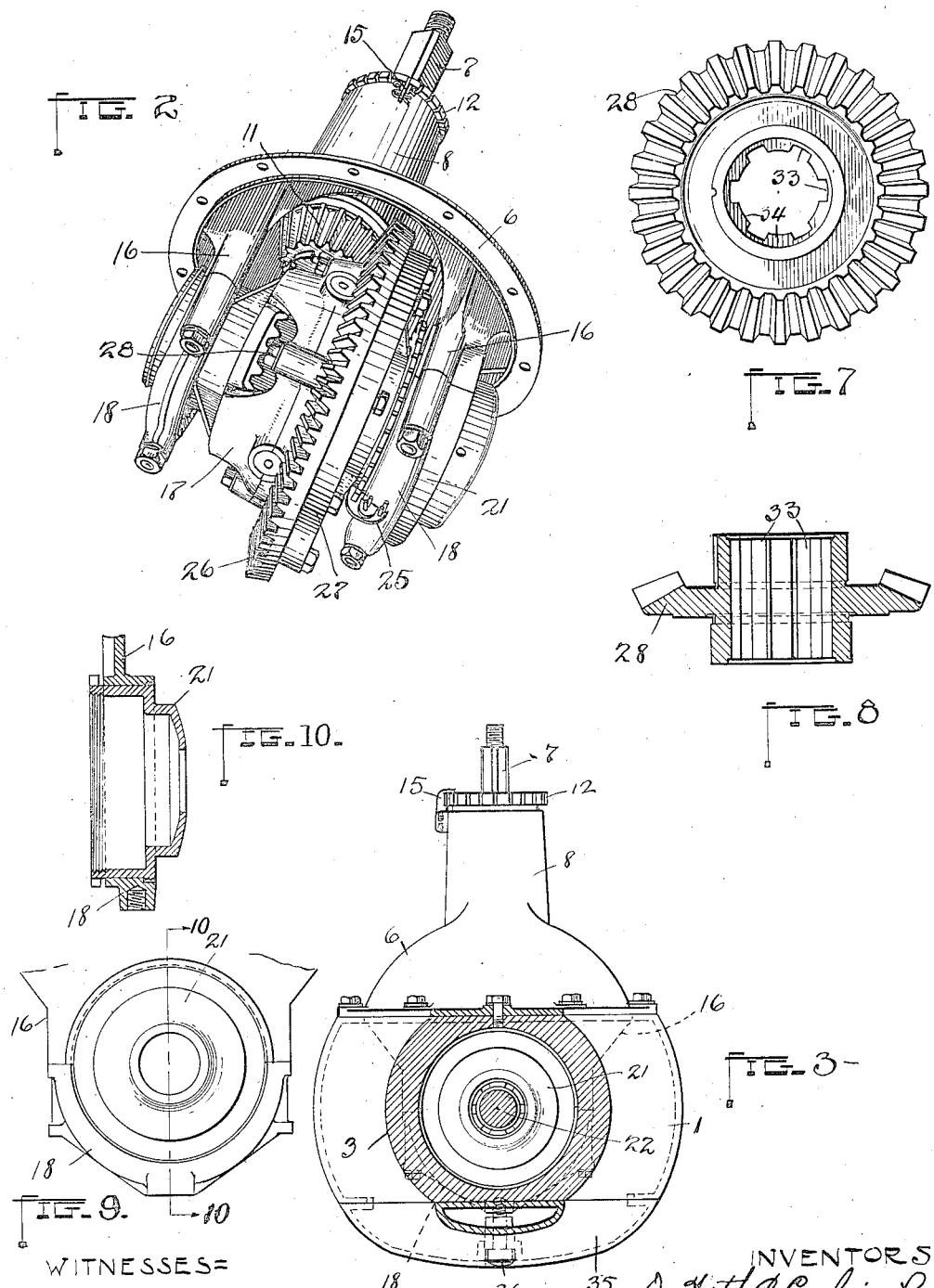

DE WITT C. COOKINGHAM AND JOHN H. HERTNER, OF CLEVELAND, OHIO, ASSIGNORS TO THE BAKER R & L COMPANY, OF CLEVELAND, OHIO, A CORPORATION OF OHIO.

DRIVING MECHANISM FOR MOTOR-VEHICLES.

1,173,340.      Specification of Letters Patent.      Patented Feb. 29, 1916.

Application filed January 11, 1912. Serial No. 670,597.

*To all whom it may concern:*

Be it known that we, DE WITT C. COOKINGHAM and JOHN H. HERTNER, citizens of the United States, and residents of Cleveland, county of Cuyahoga and State of Ohio, have jointly invented a new and useful Improvement in Driving Mechanism for Motor-Vehicles, of which the following is a specification, the principle of the invention being herein explained and the best mode in which we have contemplated applying that principle, so as to distinguish it from other inventions.

The present improvements relate more particularly to the construction of the rear axles of automobiles or like motor driven vehicles, the object being to provide such a mounting for the differential gearing, which forms the characteristic feature in modern automobile rear axles, that various adjustments may be readily and conveniently made, both for preliminarily bringing the gears into proper mesh, and for taking up such wear as may subsequently occur.

A further object is to provide an improved connection between the axle sections and the differential gears, wherewith such sections are respectively connected at their inner ends.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings: Figure 1 is a horizontal section of a rear axle, constructed in accordance with our present improved design; Fig. 2 is a perspective view of the differential mechanism, showing it bodily removed from the rest of the axle structure; Fig. 3 is a transverse vertical section of the axle taken on the plane indicated by the line 3—3, Fig. 1; Fig. 4 is a side elevational view of the inner end of one of the shaft sections; Fig. 5 is an end elevation of the same; Fig. 6 is a transverse section of such shaft section taken on the line 6—6, Fig. 4; Fig. 7 is an elevational view of one of the driven gears of the differential mechanism; Fig. 8 is a transverse section of such gear; while Figs. 9 and 10 represent in end elevation and section, respectively, a modification of one of the bearings for the differential drum.

In Fig. 1 is shown only a little more than half of the complete axle structure, such structure comprising, so far as its load sustaining function is concerned, a central casing 1 of more or less annular form, with openings in front and in the rear, and two horizontally extending tubes 2, that form the axle casing proper. These tubes are secured at their inner ends in lateral tubular extensions 3 of the central casing, and at their outer ends are provided with external bearings 4 upon which are supported the vehicle wheels. Only the hub 5 of one such wheel is shown in Fig. 1, the several details of construction of such hub appearing in the figure being of no present interest. The inwardly directed opening in the central casing 1 is normally closed, in the assembled condition of the axle, by a shell-like member 6 that forms the support for the differential mechanism, as well as for the driving spindle 7. Such spindle is journaled in suitable bearings provided in a tubular extension 8 of said shell that is disposed at right angles to the axis of the axle proper. Such bearings comprise two sets of bearing rings 9, 9 and 10, 10, between which are interposed balls, as usual, the rear set of rings 9, 9, being slidably mounted in the bore of the tubular extension 8 and being held in place on the spindle by the driving pinion 11 that is mounted on the rear end of the latter. The other set of bearing rings 10, 10, is carried in an adjusting nut 12 that is threaded in the aforesaid tubular extension 8 so that by rotation thereof, such rings are moved longitudinally of the extension. Associated with the bearing rings 10, 10, are two other rings 13, 13 which, with interposed balls, form an end thrust bearing for the spindle 7, being held in place within the adjusting nut 12 by means of a retaining nut 14, which closes the outer end of said adjusting nut. A fastener 15, pivoted to the extension 8 and engaging notches in the periphery of the adjusting nut, serves to secure the latter in whatever position it may be left (see Fig. 3).

The inner face of the differential-supporting member 6 is provided with brackets 16 (see Figs. 1 and 2) formed with semi-circular bearings in which the differential housing or drum 17 is secured by means of caps 18 formed with semi-circular bearings corresponding with those in the brackets. The differential drum, the general construction of which is best exhibited in aforesaid Fig. 2, carries two sets of bearing rings 19, 19 and 20, 20, with interposed balls, one set at each of its ends. The outer ring 19 in the case of the set at the left end of the drum, as shown in Fig. 1, is slidably adjustable in the bearing provided by the corresponding bracket and cap, while the other set of rings 20 is supported, not directly in the bearing provided by the adjacent bracket and cap, but in an adjusting nut 21 that is threaded in the bearing thus provided, so as to be capable of variously positioning said bearing rings longitudinally of the axis of the shaft sections 22. This differential-adjusting nut 21, not only supports the bearing rings 20 just referred to, which are designed to take up lateral thrusts, but also end-thrust bearings, as shown in Fig. 1, the rings 23, 23 and the interposed balls for such end-thrust bearings, as well as rings 20, 20, being held in place by the aid of a retaining nut 24. The adjusting nut 21 is adapted to be secured against rotation, when the bearings have been properly positioned, by a fastener 25 pivoted to the adjacent cap 18 and adapted to engage any one of a series of notches in said adjusting nut (see Fig. 2). The large bevel gear 26 of the differential is secured to a flange 27 on the differential housing or drum 18, the mounting of which has just been described, so as to mesh with the driving pinion 11 on the spindle 7, and it is to secure a proper engagement between such gear and pinion that the adjustment of the drum longitudinally of the axle sections, as also the adjustment of the driving spindle with its pinion longitudinally of its own axis, are provided.

It will be observed that, by the construction of the adjusting nuts 12 and 21 provided for effecting these respective adjustments, the latter may be made entirely from one end of the differential drum and the driving spindle, respectively. In other words, the bearing rings at the left end of the drum, as shown in Fig. 1, and at the inner end of the driving spindle are carried with the drum or spindle, as the case may be, when either of the latter is moved longitudinally by rotation of the corresponding adjusting nut. There is accordingly no necessity for loosening the rings at one end of the member to be adjusted, and then taking up the rings at the other end, with the further necessity of making several trials before a correct adjustment is secured and then having remain the possibility of binding the ball bearings; for, in the present construction, the latter are carried with the drum and spindle and cannot be affected by the endwise adjustment of the latter.

The internal construction of the differential mechanism is not of present interest, other than as to the manner in which the inner ends of the shaft-sections 22 are secured in the hubs of the differential gears 28. The latter are shown as beveled gears, being driven by beveled differential pinions 29 carried on a spider 30, the detailed construction of which forms the subject matter of U. S. Letters Patent No. 1,029,793 issued to us June 18, 1912.

We are aware that it has been usual heretofore to provide such a connection between the inner ends of the shaft sections and the gears just referred to, that the shaft sections may be withdrawn endwise without disturbing the gears or the differential mechanism, but more or less difficulty has always been experienced in securing a tight fitting and noiseless connection at this point and yet leave such connection with the flexibility which it must necessarily have in order to provide for the distortion to which the axle casing and axle sections are subjected when in use, slight though such distortion may be. The ends of the shaft sections are accordingly provided with a plurality (six as shown) of longitudinally extending, radially projecting lugs or keys 31, the sides of said lugs being parallel with each other, and the spaces 32 between the same being cut out, as shown in the end elevational and sectional views of Figs. 5 and 6, below the normal cylindrical surface of the end of the shaft. The bores of the hubs of the two differential gears 28 are made of substantially the same diameter as the axle ends and are provided with longitudinally extending recesses 33 corresponding in number and disposition to the lugs or keys 31 on the axle ends, such recesses having similar straight sides and flat bottoms. (See Figs. 7 and 8).

From the foregoing described construction of the axle-sections and differential gears, it will be seen that only the annular portion of each axle end marked 38 in Figs. 4 and 5 is actually journaled in the corresponding gear; that is, only this portion has a bearing contact about its entire periphery with the bore in the gear hub. The longitudinal extent, or the width of the annular bearing portion of the axle is relatively small, so that it is possible for the shaft or axle-section to rock slightly without any evidence of binding; in fact a result substantially the same as though the bearing surface were of toric form is obtained while still leaving a sufficient area of contact to permit a film of oil to be maintained between the bearing surfaces, as is highly desirable.

The lugs 31 and recesses 33, it will be observed, have only a lateral engagement with each other (i. e. in a rotatable direction), both such recesses 33 and those (32) between the aforesaid lugs being deep enough not to interfere with the rocking, or transversely oscillatory, movement of the axle sections previously referred to. There may be, and preferably is, allowed a certain amount of play between these lugs and recesses in such rotative direction as well, since no noticeable noise or rattle arises from this source and as much freedom as possible is for other reasons desired.

When the parts are in their completely assembled condition, the rearwardly directed opening in the central enlarged portion 1 of the axle housing is closed by a cover 35 that is secured, by means of set bolts 36, to the brackets that project from the differential supporting member, or rather to the caps 18 that serve to secure the differential mechanism to said supporting member.

The modification illustrated in Figs. 9 and 10 relates to the manner in which adjusting nut 21 for shifting the differential drum 17 longitudinally of its axis, is threaded in the adjacent bracket 16 and cap 18. In the construction shown in Fig. 1, both the bracket and the cap are interiorly threaded, but this makes it necessary that the cap should be very carefully fitted onto the supporting member, else the threads will not correspond. Even where they are cut with the parts in question assembled, they are apt to get slightly out of alinement after the cap has been removed and replaced a number of times. Accordingly, in the modified construction, threads are provided in the one part only, preferably in the bracket as being the more rigid member to which the other is secured. The threads are desirably made of rectangular cross section so that they may have a broader bearing contact with the inner surface of the cap, the latter being turned smooth and having a diameter equal to that of the bottoms of the threads on the bracket.

It is only necessary to briefly review the foregoing description in order to make clear the mode of operation and use of the one improved construction of axle. The axle sections, it will be obvious, can be removed endwise from the axle housing by taking off the wheels that serve to support their outer ends, said sections being supported entirely clear of the axle casing. When it is simply desired to examine the interior of the central, or differential casing, this may be done with, or without, the axle sections being removed, by detaching the rear cover plate 35. The differential mechanism is thus exposed to view and may not only be lubricated but the differential drum 17 may be adjusted longitudinally of the axis of the driving spindle 7 without removing any portion of the housing, by simply rotating the adjusting nut 14.

When it is desired to entirely remove the differential mechanism from its housing, this is done by detaching the forward differential-supporting member 6 from said housing, whereupon not only such mechanism, but also the driving spindle, is detached from the rest of the rear axle casing, as illustrated in the perspective view forming Fig. 2 of the drawings. It is, of course, necessary to withdraw the axle sections before the parts just referred to can be thus removed. Obviously, the adjustment of the differential drum and of the driving spindle with its pinion can be attended to, as for example, in the course of assembling the axle or after repairing the differential, with the drum attached to said differential supporting member, just as shown in Fig. 2 just referred to. It then remains simply to attach said member to the differential housing and slip in the axle sections, to complete the assembling, no further adjustment being necessary after the supporting member has been secured in place.

The ease and simplicity of adjustment of the differential drum, involving simply the adjustment of a single adjusting nut, whereby the bearings at both ends of the drum are simultaneously shifted, does not require any further comment, and the superiority of the joint between the differential gears and the axle sections, whereby a loose fit in a rotative direction is secured and the axle sections left free to oscillate transversely of the axis of the gears, while still journaling said axle sections sufficiently tight to eliminate noise, should be evident.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention—

1. In mechanism of the character described, the combination of a casing open on opposite sides and having two laterally extending tubes; detachable members for closing such openings in said casing, respectively; a driving pinion and differential mechanism carried by one of said members and removable from said casing along with said member; and two axle-sections disposed in said tubes and detachably connected at their inner ends with said differential mechanism.

2. In mechanism of the character described, the combination of a casing open on opposite sides and having two laterally extending tubes; detachable members for closing such openings in said casing, respectively; a driving pinion and differential mechanism carried by one of said members, said driving pinion and differential mechanism being independently adjustable longitudinally of their respective axes and being removable from said casing along with said member; and two axle-sections disposed in said tubes and detachably connected at their inner ends with said differential mechanism.

3. In mechanism of the character described, the combination of a casing open on opposite sides and having two laterally extending tubes; detachable members for closing such openings in said casing, respectively; a driving spindle journaled in one of said members at right-angles to the line of said tubes, said spindle being adjustable longitudinally of its axis; a bevel pinion on the inner end of said spindle; a drum secured to the same member in which said driving spindle is journaled so as to be rotatable about an axis alined with said tubes, said drum being adjustable longitudinally of its axis; differential mechanism carried by said drum, said mechanism including a bevel gear adapted to mesh with said bevel pinion; and two axle-sections disposed in said tubes and detachably connected at their inner ends with said differential mechanism.

4. In mechanism of the character described, the combination of a casing open on opposite sides and having two laterally extending tubes; detachable members for closing such openings in said casing, respectively; a driving spindle journaled in one of said members at right-angles to the line of said tubes, said spindle being adjustable longitudinally of its axis; means at the outer end of said spindle adapted thus to adjust the same; a beveled pinion on the inner end of said spindle; a drum secured to the same member in which said driving spindle is journaled so as to be rotatable about an axis alined with said tubes, said drum being adjustable longitudinally of its axis; differential mechanism carried by said drum, said mechanism including a bevel gear adapted to mesh with said bevel pinion; means at one end of said drum adapted to adjust the same; and two axle-sections disposed in said tubes and detachably connected at their inner ends with said differential mechanism.

5. In mechanism of the character described, the combination of a casing open on opposite sides and having two laterally extending tubes; detachable members for closing such openings in said casing, respectively; a driving spindle journaled in one of said members at right-angles to the line of said tubes; a bevel pinion on the inner end of said spindle; ball-bearings at the inner and outer ends of said spindle; an adjusting nut in said member carrying the bearing at the outer end of said spindle, the bearing at the inner end of the spindle being carried along with the latter; a drum rotatably secured to the same member about an axis alined with said tubes, said drum being adapted to be driven by said bevel pinion; differential mechanism carried by said drum; and two axle-sections disposed in said tubes and detachably connected at their inner ends with said differential mechanism.

6. In mechanism of the character described, the combination of a casing open on opposite sides and having two laterally extending tubes; detachable members for closing such openings in said casing, respectively; a driving spindle journaled in one of said members at right-angles to the line of said tubes; a bevel pinion on the inner end of said spindle; ball-bearings at the inner and outer ends of said spindle; an adjusting nut in said member carrying the bearing at the outer end of said spindle, the bearing at the inner end of the spindle being carried along with the latter; a drum detachably, rotatably secured to the same member about an axis alined with said tubes, said drum being adjustable longitudinally of its axis; differential mechanism carried by said drum, said mechanism including a bevel gear adapted to mesh with said bevel pinion; and two axle-sections disposed in said tubes and detachably connected at their inner ends with said differential mechanism.

7. In mechanism of the character described, the combination of a casing open on opposite sides and having two laterally extending tubes; detachable members for closing such openings in said casing, respectively; a driving spindle journaled in one of said members at right-angles to the line of said tubes; a bevel pinion on the inner end of said spindle; ball-bearings at the inner and outer ends of said spindle; an adjusting nut in said member carrying the bearings at the outer end of said spindle, the bearings at the inner end of the spindle being carried along with the latter; a drum detachably, rotatably secured to the same member about an axis alined with said tubes; differential mechanism carried by said drum, said mechanism including a bevel gear adapted to mesh with said bevel pinion; ball-bearings at the respective ends of said drum; an adjusting nut in said member carrying the bearing at one end of said drum, the bearing at the other end thereof being carried along with the drum; and two axle-sections disposed in said tubes and detachably connected at their inner ends with said differential mechanism.

8. In mechanism of the character described, the combination of a casing open on opposite sides and having two laterally extending tubes; detachable members for closing such openings in said casing, respectively; a driving spindle journaled in one of said members at right-angles to the line of said tubes; a bevel pinion on the inner end of said spindle; a drum rotatably secured to the same member about an axis alined with said tubes, said drum being adjustable longitudinally of its axis; differential mechanism carried by said drum, said mechanism including a bevel gear adapted to mesh with said bevel pinion; means at one end of said drum adapted thus to adjust the same; and two axle-sections disposed in said tubes and detachably connected at their inner ends with said differential mechanism.

9. In mechanism of the character described, the combination of a casing open on opposite sides and having two laterally extending tubes; detachable members for closing such openings in said casing, respectively; a driving spindle journaled in one of said members at right-angles to the line of said tubes; a bevel pinion on the inner end of said spindle; a drum detachably, rotatably secured to the same member about an axis alined with said tubes; differential mechanism carried by said drum, said mechanism including a bevel gear adapted to mesh with said bevel pinion; ball bearings at the respective ends of said drum; an adjusting nut in said member carrying the bearing at one end of said drum, the bearing at the other end thereof being carried along with the drum; and two axle-sections disposed in said tubes and detachably connected at their inner ends with said differential mechanism.

10. In mechanism of the character described, the combination of a casing having two laterally extending tubes; a driving spindle in one side of said casing at right-angles to the line of said tubes; a bevel pinion on the inner end of said spindle; a drum rotatably secured to said casing about an axis alined with said tubes, said drum being adjustable longitudinally of its axis; differential mechanism carried by said drum, said mechanism including a bevel gear adapted to mesh with said bevel pinion; means at one end of said drum adapted to adjust the same in either direction as desired; and two axle-sections disposed in said tubes and connected at their inner ends with said differential mechanism.

11. In mechanism of the character described, the combination of a casing having two laterally extending tubes; a driving spindle in one side of said casing at right-angles to the line of said tubes; a bevel pinion on the inner end of said spindle; a drum detachably, rotatably secured to said casing about an axis alined with said tubes; differential mechanism carried by said drum, said mechanism including a bevel gear adapted to mesh with said bevel pinion; ball bearings at the respective ends of said drum; an adjusting nut in said member carrying the bearing at one end of said drum, the bearing at the other end thereof being carried along with the drum; and two axle-sections disposed in said tubes and detachably connected at their inner ends with said differential mechanism.

12. In mechanism of the character described, the combination of a casing having two laterally extending tubes; a driving spindle in one side of said casing at right-angles to the line of said tubes; a bevel pinion on the inner end of said spindle; inwardly projecting brackets in said casing formed with semi-circular bearings; caps for said brackets formed with complementary semi-circular bearings; a drum rotatably secured to said brackets by said caps; differential mechanism carried by said drum, said mechanism including a bevel gear adapted to mesh with said bevel pinion; ball bearings at the respective ends of said drum; an adjusting nut threaded in the bearing formed by one bracket and cap and carrying the ball bearing on the corresponding end of the drum, the ball bearing on the other end of said drum being carried by the drum, and slidably held by the corresponding bracket and cap; and two axle-sections disposed in said tubes and detachably connected at their inner ends with said differential mechanism.

13. In mechanism of the character described, the combination of a casing having two laterally extending tubes; a driving spindle in one side of said casing at right-angles to the line of said tubes; a bevel pinion on the inner end of said spindle; inwardly projecting brackets in said casing formed with semi-circular bearings; caps for said brackets formed with complementary semi-circular bearings; a drum rotatably secured to said brackets by said caps; differential mechanism carried by said drum, said mechanism including a bevel gear adapted to mesh with said bevel pinion; ball bearings at the respective ends of said drum; an adjusting nut threaded in the semi-circular bearing in one bracket, the complementary cap-bearing being smooth, said nut carrying the ball bearing on the corresponding end of the drum, and the ball bearing on the other end of said drum being carried by the drum and slidably held by the corresponding bracket and cap; and two axle-sections disposed in said tubes and detachably connected at their inner ends with said differential mechanism.

14. In mechanism of the class described, the combination of a casing having two laterally extending tubes; a driving spindle in one side of said casing at right-angles to the line of said tubes, said spindle being adjustable longitudinally of its axis; a bevel pinion on the inner end of said spindle; means at the outer end of said spindle adapted thus to adjust the same; a drum rotatably secured to said casing about an axis alined with said tubes; differential mechanism carried by said drum, said mechanism including a bevel gear adapted to mesh with said bevel pinion; and two axle-sections disposed in said tubes and connected at their inner ends with said differential mechanism.

15. In mechanism of the class described, the combination of a casing having two laterally extending tubes; a driving spindle in one side of said casing at right-angles to the line of said tubes; a bevel pinion on the inner end of said spindle; ball-bearings at the inner and outer ends of said spindle; an adjusting nut in said casing carrying the bearing at the outer end of said spindle and adapted to adjust said spindle along therewith; a drum rotatably secured to said casing about an axis alined with said tubes; differential mechanism carried by said drum, said mechanism including a bevel gear adapted to mesh with said bevel pinion; and two axle-sections disposed in said tubes and connected at their inner ends with said differential mechanism.

Signed by us, this 9th day of January, 1912.

DE WITT C. COOKINGHAM.
JOHN H. HERTNER.

Attested by—
ANNA L. GILL,
JNO. F. OBERLIN.